Nov. 1, 1960 — Z. MIHAILOVIC ET AL — 2,958,799
ELECTROSTATIC FOCUSSING DEVICE
Filed May 31, 1955 — 3 Sheets-Sheet 1
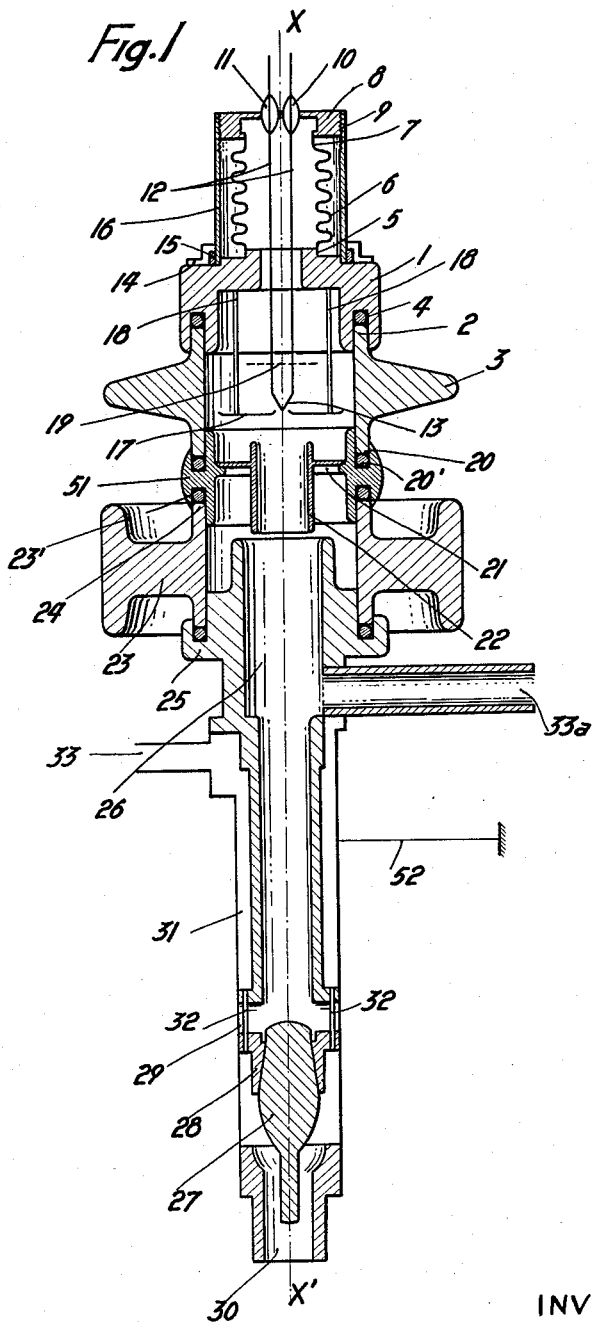
INVENTORS
ZIVKO MIHAILOVIC
ALEXANDRE RIMSKY
BY Pollard Johnston,
Smythe & Robertson
ATTORNEYS

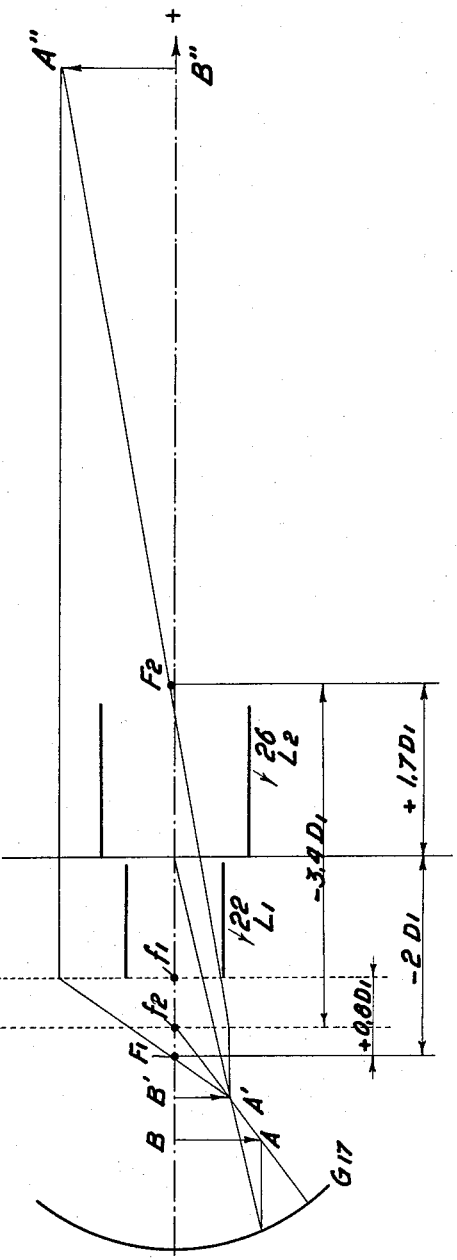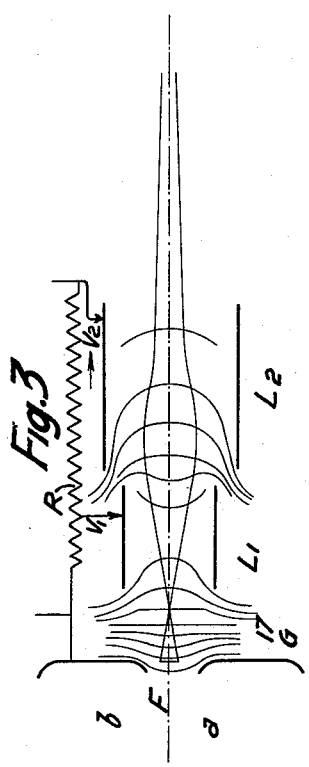

United States Patent Office 2,958,799
Patented Nov. 1, 1960

2,958,799
ELECTROSTATIC FOCUSSING DEVICE

Zivko Mihailovic, Paris, and Alexandre Rimsky, Meudon, France, assignors to Centre National de la Recherchie Scientifique, Paris, France, a corporation of France Filed May 31, 1955, Ser. No. 512,074

Claims priority, application France June 1, 1954

2 Claims. (Cl. 313—57)

It is known that X-ray generators used in radio-crystallography in particular, should comply with the following main conditions, and should have:

A source of emission of relatively small size; this feature has the advantage of enabling the incident beams of rays to be defined in a more geometric manner, thus greatly simplifying the problem of collimation;

Fine, homogeneous sources of emission which enable the anti-cathode or anode to dissipate more readily the thermal energy developed at the source, with a higher degree of brilliance and a better efficiency;

A filament or cathode which is sufficiently distant from the anti-cathode, so as to obviate any deposit of metal from the filament on the anti-cathode.

It should here be observed that the metal of the anti-cathode is in a state of superficial fusion at the point of impact of the electrons; the result of this is that in the vicinity of the anti-cathode, metallic vapours are produced, which, in the case of high potentials and a cathode which is very close, give rise to detrimental discharges which are apt to generate high frequency oscillations in the supply circuits of rectified and continuous high-tension current.

When the distance which separates the filament from the anti-cathode is of the order of about ten millimetres, the tungsten atoms are separated out in the cold state as a result of the high potential gradient obtained in the apparatus, and are deposited on the anti-cathode. The same phenomenon is produced in the case of focussing X-ray tubes in which, in spite of the distance of the anti-cathode from the filament, the metal extracted is projected towards the lenses of the optical system before reaching the anti-cathode. These various phenomena have the result of shortening to a very appreciable extent the useful life of the filament.

In order to improve the conditions of operation of X-ray tubes, the addition of electro-magnetic optical devices for carrying the image of the source of electronic emission has already been proposed. In spite of their undoubted advantages, electro-magnetic lenses require, however, a stabilised supply of direct current, since the optical properties are only valid for electrons having a pre-determined speed. Each different mode of operation of the tube thus requires an adjustment of the lens; it is for this reason that electro-magnetic optical systems are not used.

Symmetrical electrostatic optical systems have also previously been employed, the construction of these systems necessitating, in particular, the super-position of three electrodes: positive, negative and positive in succession, in a very small space and under vacuum. Apparatus of this kind is in the first place very difficult to construct and, in the second place, these apparatus behave like a density-modulated klystron, since the two successive cavities in which exist a high potential gradient give rise to the production of oscillations at high frequency.

The present invention has for its object to eliminate these drawbacks of the known apparatus; it has for its object a device for the electrostatic focussing of electrons, characterized by the fact that it employs an asymmetric optical system. The device in accordance with the invention enables the image of a source of electrons to be formed on an anti-cathode, and especially enables X-rays to be produced. All cavities are eliminated in the device which forms the object of the invention.

The asymmetric optical system is constituted by at least two co-axial cylinders which are suitably disposed along the electronic path, and each of which is maintained at a positively increasing potential along the trajectory of the electrons. The distribution of the potentials may be obtained by means of known apparatus; in particular there may be employed a potentiometer resistance connected in parallel with the said tube, the whole assembly of the device operating at the same time as an electron accelerator and an image carrier.

The dimensions of the emission source of the X-rays may also be modified by acting on the position of the image supplied by the assembly of the control-grid and the filament, constituting an electronic gun. To this end, a device can be used comprising a metal-plastic membrane, such as a conventional metal bellows, with a view to displacing the filament along the axis of the apparatus with respect to the control-grid, and the output of the tube is regulated by polarising the control-grid more or less negatively with respect to the filament.

If, in the case of a device in accordance with the invention, the diameter of the first cylinder is designated by $D_1$, having a potential of $V_1$, while $D_2$ and $V_2$ are respectively the diameter and the potential of the second cylinder, we have the following relations: $D_1 < D_2$, and $V_1 < V_2$.

The optical characteristics of this system are a function of the ratio $D_2/D_1$ which is fixed by the construction, and of $V_2/V_1$, which can be varied. The final image of the filament can be obtained at a substantial distance from the optical system and, in consequence, from the filament. This possibility thus enables one or two opposite windows or openings to be provided at about ten millimetres from the source of emission and thus to supply two oppositely-arranged tubes from one and the same filament.

The optical parameters are not influenced by the value of the acceleration potential $V_2$ on condition that $V_1/V_2$ remains constant. This requirement can be satisfied in a very simple manner by means of a potentiometer resistance which is connected in parallel with the tube, and which enables the value of the ratio of $V_2/V_1$ to be adjusted in the way previously described.

As the potential is caused to increase along the axis of the tube, and as all cavities are eliminated, the device cannot oscillate. Experience has shown that the tube is not anywhere subject to over-voltage, but that on the contrary its behaviour is perfect in the case of a discharge due to insufficient vacuum.

When it is desired to work at very high potentials, the number of cylinders may be increased by superposing identical elements on each other.

In the attached drawings, a number of examples have been shown without any implied restriction, of forms of embodiment in accordance with the invention. The description which follows will also bring out other special features and advantages of this device.

In these drawings:

Fig. 1 shows a view in axial cross-section of a usual type of apparatus provided with a device in accordance with the invention;

Figs. 2 and 3 show the optical working diagram of a device of this kind;

Figure 4:
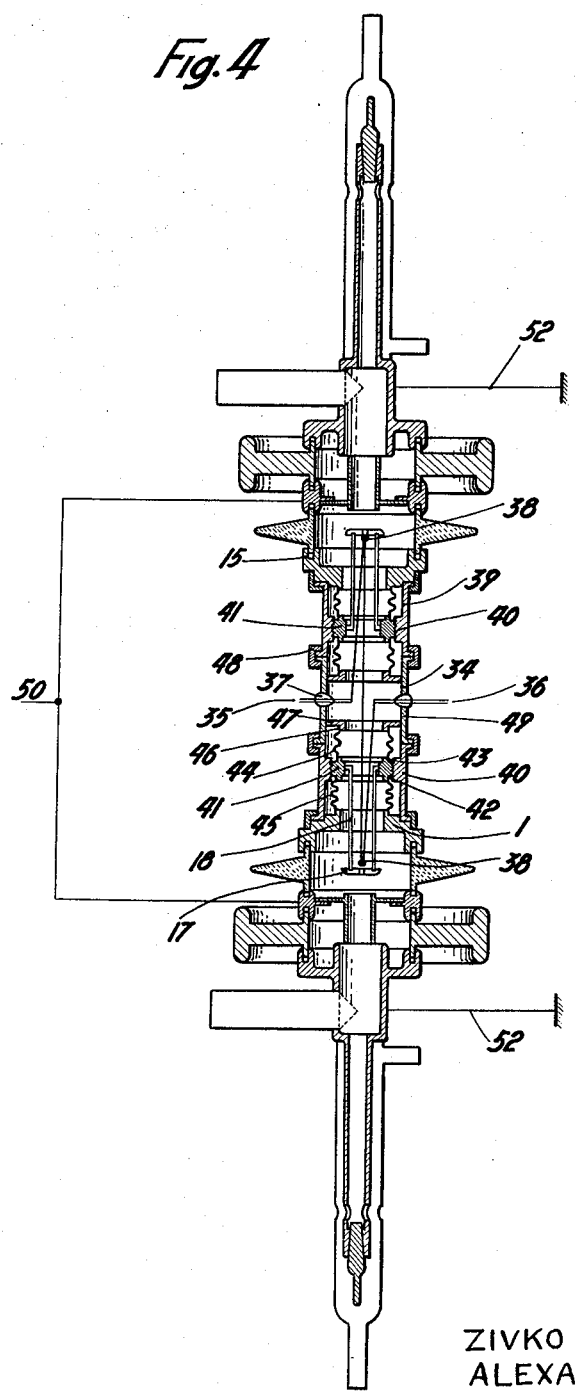
Fig. 4 is an axial cross-section of a device in accordance with the invention and comprises two X-ray generator tubes coupled to the same filament.

As shown in Fig. 1, the apparatus comprises a cylindrical metallic member 1 provided with a circular groove 2 in which is engaged a steatite sleeve 3; a hermetic seal is ensured by means of a ring or toric joint 4. To this member 1 is welded at 5 a metal-plastic membrane 6 which is also welded at 7 to an end-plate 8 which is threaded externally at 9. The end-plate 8 is provided with two insulating glass-to-metal leading-in connections 10 and 11 which support the filament 13 through the medium of two conducting rods 12.

The ring 15 is held in position by means of squares 14 provided on the member 1, on the tube 16 the upper portion of which is internally threaded.

By turning the ring 15, the tube 16 is rotated; by this means, the position of the filament 13 along the axis X—X' of the tube with respect to the control-grid 17 can thus be varied under vacuum through the medium of the metal-plastic membrane 6. The control-grid 17 is constituted by a metallic sheet (for example of nickel); in the example shown, the edges of this grid are rounded and in the centre is formed an incurved opening provided for the passage of the filament 13. This grid is fixed to the sleeve 1 by the intermediary of rigid metal rods 18. The grid 17 may however be given any other forms appropriate to its particular use.

A sheet of mica 19 protects the sleeve 1 against the infra-red radiation of the filament 13.

The groove 20 couples the steatite sleeve 3 to a metal ring 51, a hermetic seal being ensured by a toric joint 20. The metallic ring 51 is provided with an internal shoulder 21 on which is fixed the hollow cylinder 22 which constitutes the first lens. Through the intermediary of the groove 24, the metallic ring 51 is coupled to a further steatite sleeve 23, the hermetic seal being ensured by means of a toric joint 23'. The sleeve 23 is also coupled to the sleeve 25 of the body of the tube proper by means of a similar arrangement comprising a groove and a toric joint.

The body of the tube proper is formed by a cylindrical tube 26 which constitutes the second lens, and by the anti-cathode or anode which is constituted by a metal block 27 consisting of a good conductor of heat such as copper or silver, and which is fitted to the support 28. The whole assembly is suitably machined so as to obtain a perfect vacuum-tightness of the whole apparatus. Windows 29 are provided at the level of the anti-cathode in the body of the tube, which is also provided with an exhausting-tube 33a.

The cooling of the anti-cathode and of the body of the tube is effected by means of a water circulation system. The water is brought in at 30 to the lower part, passes into the cavity 31 through the tubes 32, and is evacuated through the pipe 33. The device also comprises a conductor 52 which connects the apparatus to earth.

The optical diagram of operation shown in Figs. 2 and 3 enables especially the part played by the control grid 17 to be explained.

The control grid G (17) plays the part of a concave electronic mirror, mounted in such a way as to give an image A'B' of the filament AB (13), reduced in size and straight, the magnification $$m = +\frac{A'B'}{AB}$$

being less than 1. This result is due to the fact that since the grid is negative with respect to the filament AB, the equi-potential surfaces will penetrate into the opening of the said grid at $ab$ (see Fig. 3).

The image A'B' plays the part of an object for the system of the two lenses $L_1$ (22) and $L_2$ (26); the magnification may assume different values, depending on the position of AB with respect to the grid 17 and on the positive potential applied to the filament 13.

In accordance with the invention, very small values are given to this magnification, so that the system of lenses 22 and 26 gives an image A"B" of A'B' which is magnified, but which is smaller than AB, and this enables a fine emission source to be obtained.

When carrying out a study of electronic diffraction, the substance to be studied will be placed at A'B' for example.

The optical characteristics of the said concave mirror will be modified as a function of the position of AB (filament 13) and of the positive potential applied to AB with respect to the control grid 17. Depending on the cases, either the one or the other of the parameters is adjusted, or they are modified simultaneously; by this means the flexibility of use of the apparatus is enhanced.

In a device in current use: $D_1 = 20$ mm., $D_2 = 30$ mm., $$\frac{D_2}{D_1} = 1.5, \text{ and } \frac{V_2}{V_1} = 8.5$$

If in Fig. 2, $F_1$ and $F_2$ are designated to represent the two respective foci of the image and object, and $f_1$ and $f_2$ are the focal distances which correspond to the principal planes $H_1$ and $H_2$ of the image and object respectively, and if the general direction of movement of the electrons (filament→ anti-cathode) has been chosen as the positive direction, the main characteristics of the device are as follows:

Principal focus $F_1 = -2D_1$ (for the image)
$f_1 = +0.8D_1$ image focus from $F_1$
Principal focus $F_2 = +1.7D_1$ (for the object)
$f_2 = -3.4D_1$ object focus from $F_2$ The magnification is of the order of $-3$.

The size of the focus will depend essentially on the form of the filament. Foci of the order of $\frac{1}{10}$ mm. up to 20 mm. have been obtained, depending on whether the filament is a hot point or a linear wire of 10 mm. in length, and by acting on the polarisation of the control grid and on its position with respect to the filament.

In the practical example which has just been described, the characteristics of operation are as follows:

With a continuous and rectified potential of 50 kv. and an output of 8 milliamperes, a focus of 2 to 3 tenths of millimetres seen at an incidence of 6°, the following results have been obtained with a collimator of $\frac{3}{10}$ of millimetres with one hole and an anti-cathode of molybdenum.

(1) Laue negatives.
Mica (cleavage) thickness $\frac{3}{10}$ of millimetres, negative obtained in 8 to 10 minutes;
Curie cut quartz, thickness $\frac{15}{10}$ millimetres, negative obtained in 15 minutes;
Gypsum (cleavage), thickness $\frac{4}{10}$ millimetres, negative obtained in 15 minutes.
The distance from the crystal to the film = 40 mm.

(2) Rotating crystal.
On a blende crystal and with a rotating crystal chamber of 240 mm. in circumference, the exposure times for the characteristic line $K\alpha$ were as follows:
For a standard type of sealed tube, with a zirconium filter, the exposure time was 3 hours.
With a tube having electronic focussing in accordance with the invention, and with a zirconium filter, the exposure time was 30 minutes.

In the device consisting of two X-ray generating tubes coupled to the same filament as shown in Fig. 4, there are provided, in addition to the parts and members already shown in Fig. 1:

A cylindrical member 34 comprising the incoming and outgoing current connections 35 and 36 respectively, these being suitably insulated by means of the metal-to-glass joint 37.

The filaments 38 which are fixedly-mounted,

A cylindrical member 39 comprising a threaded portion 40 to which is fitted a member 41 similarly threaded.

To this latter member, two metal-plastic membranes 44 and 45 are welded at 42 and 43. The membrane 44 is welded at 46 to the member 47 rigidly fixed to the tube 44, and the membrane 45 is welded to the member 1 of the X-ray generating tube proper. To the member 41 are welded the support rods 18 for the control grid 17. The cylindrical tubes 34 and 39 are coupled to each other by means of stirrup pieces 48.

In the case of this device, the filaments 38 are fixed and the control grid is movable. The distance between the filament and the grid can be varied by acting on the rings 15, which enables the member 39 to be rotated, thus controlling the displacement of the member 41. The terminals 49 and 50 enable the device to be put under tension, the body of the tube being connected to earth.

In the devices in accordance with the present invention, the asymmetric electronic optical system almost wholly prevents any diffusion of the electrons from their normal path. The electrons thus channelled ionise a small number of molecules of residual gas, and there is thus obtained a reduction in the ionic concentration which results in an increase in the useful life of the filament; on the other hand, the insulating walls are no longer bombarded by the electrons and do not therefore deteriorate.

The device described may be adapted both for medical and metallographic uses and can be fitted on the majority of the dismantlable tubes in service, without the necessity of considerable modifications.

What we claim is:

1. An X-ray tube including an elongated enveloping means adapted to be evacuated, a common cathode centrally located in said enveloping means, said cathode having a portion facing one end of the enveloping means and a portion facing the other end of said enveloping means, control grid means for each of said portions for controlling the image provided thereby, anode means at each end of the enveloping means adapted to receive rays from its respective portion of said cathode, asymmetrical electrostatic lens means comprising two adjacent lenses mounted in said enveloping means between each of said portions and its anode, each lens nearest its respective anode being of greater diameter than the other lens at their adjacent ends, and means adjustably holding said control grids in said enveloping means so that each control grid can be independently adjusted relative to its respective cathode portion.

2. An X-ray tube including an elongated enveloping means adapted to be evacuated, a common cathode centrally located in said enveloping means, said cathode having a portion facing one end of the enveloping means and a portion facing the other end of said enveloping means, control grid means for each of said portion for controlling the image provided thereby, anode means at each end of the enveloping means adapted to receive rays from its respective portion of said cathode, asymmetrical electrostatic lens means comprising two adjacent lenses mounted in said enveloping means between each of said portions and its anode, each lens nearest its respective anode being of greater diameter than the other lens at their adjacent ends, and means screw threadedly holding said control grids in said enveloping means so that each control grid can be independently adjusted relative to its respective cathode portion by turning the control grid relative to said enveloping means.

References Cited in the file of this patent

UNITED STATES PATENTS

| | | |
|---|---|---|
| 733,756 | Snook | July 14, 1903 |
| 2,113,422 | Coolidge | Apr. 5, 1938 |
| 2,119,679 | Litton | June 7, 1938 |
| 2,206,558 | Bennett | July 2, 1940 |
| 2,617,046 | Douma et al. | Nov. 4, 1952 |
| 2,683,223 | Hosemann | July 6, 1954 |